United States Patent [19]

Oono et al.

[11] Patent Number: 5,223,970
[45] Date of Patent: Jun. 29, 1993

[54] OPTICAL AXIS ADJUSTING MECHANISM AND METHOD FOR OPTICAL INFORMATION RECORDING AND REPRODUCING DEVICE, AND JIG THEREFOR

[75] Inventors: Masahiro Oono; Tsuyoshi Itoh; Masahiko Sasaki; Hiroshi Yamamoto; Katsuki Hayashi, all of Tokyo, Japan

[73] Assignee: Asahi Kogaku Kogyo Kabushiki Kaisha, Tokyo, Japan

[21] Appl. No.: 572,580

[22] Filed: Aug. 27, 1990

Related U.S. Application Data

[63] Continuation-in-part of Ser. No. 494,332, Mar. 16, 1990, abandoned.

[30] Foreign Application Priority Data

Mar. 16, 1989 [JP] Japan ............................ 1-30473
Aug. 29, 1989 [JP] Japan ............................ 1-225627
Aug. 29, 1989 [JP] Japan ............................ 1-225628

[51] Int. Cl.⁵ .................... G02B 26/08; G11B 7/00
[52] U.S. Cl. ........................ 359/223; 359/234; 369/44.15; 369/112
[58] Field of Search ............... 350/6.1–6.91, 350/247–257; 369/44.11–44.19, 44.21–44.42, 111, 112; 359/813–814, 819–827, 859, 861, 234–236, 196–200, 223–226, 831, 833–836; 250/201.5

[56] References Cited

U.S. PATENT DOCUMENTS

| | | | |
|---|---|---|---|
| 3,960,443 | 6/1976 | Goshima et al. | 350/247 |
| 4,170,404 | 10/1979 | Meye et al. | 350/255 |
| 4,607,356 | 8/1986 | Bricot et al. | 350/421 |
| 5,008,873 | 4/1991 | Tanaka et al. | 369/44.14 |
| 5,023,858 | 6/1991 | Nakayama | 369/111 |
| 5,070,493 | 12/1991 | Marshall et al. | 369/112 |
| 5,097,456 | 3/1992 | Tanoshima et al. | 369/44.14 |

FOREIGN PATENT DOCUMENTS

| | | | |
|---|---|---|---|
| 04991 | 12/1984 | European Pat. Off. | 350/247 |
| 200327 | 8/1988 | Japan | 369/44.21 |
| 32213 | 2/1989 | Japan | 350/252 |
| 192039 | 7/1990 | Japan | 369/44.21 |

*Primary Examiner*—Bruce Y. Arnold
*Assistant Examiner*—Thong Nguyen
*Attorney, Agent, or Firm*—Sughrue, Mion, Zinn, Macpeak & Seas

[57] ABSTRACT

A mechanism for adjusting an optical axis of an optical device, particularly in an optical information recording and reproducing system, in accordance with which the optical axis is movable in two directions, independently of each other. Various parts of the optical system, such as an anamorphic prism and a fixed prism, may be moved to adjust the degree of parallelism and/or displacement of a laser beam. A laser ray source in the system also may be movable independently in different directions.

9 Claims, 9 Drawing Sheets

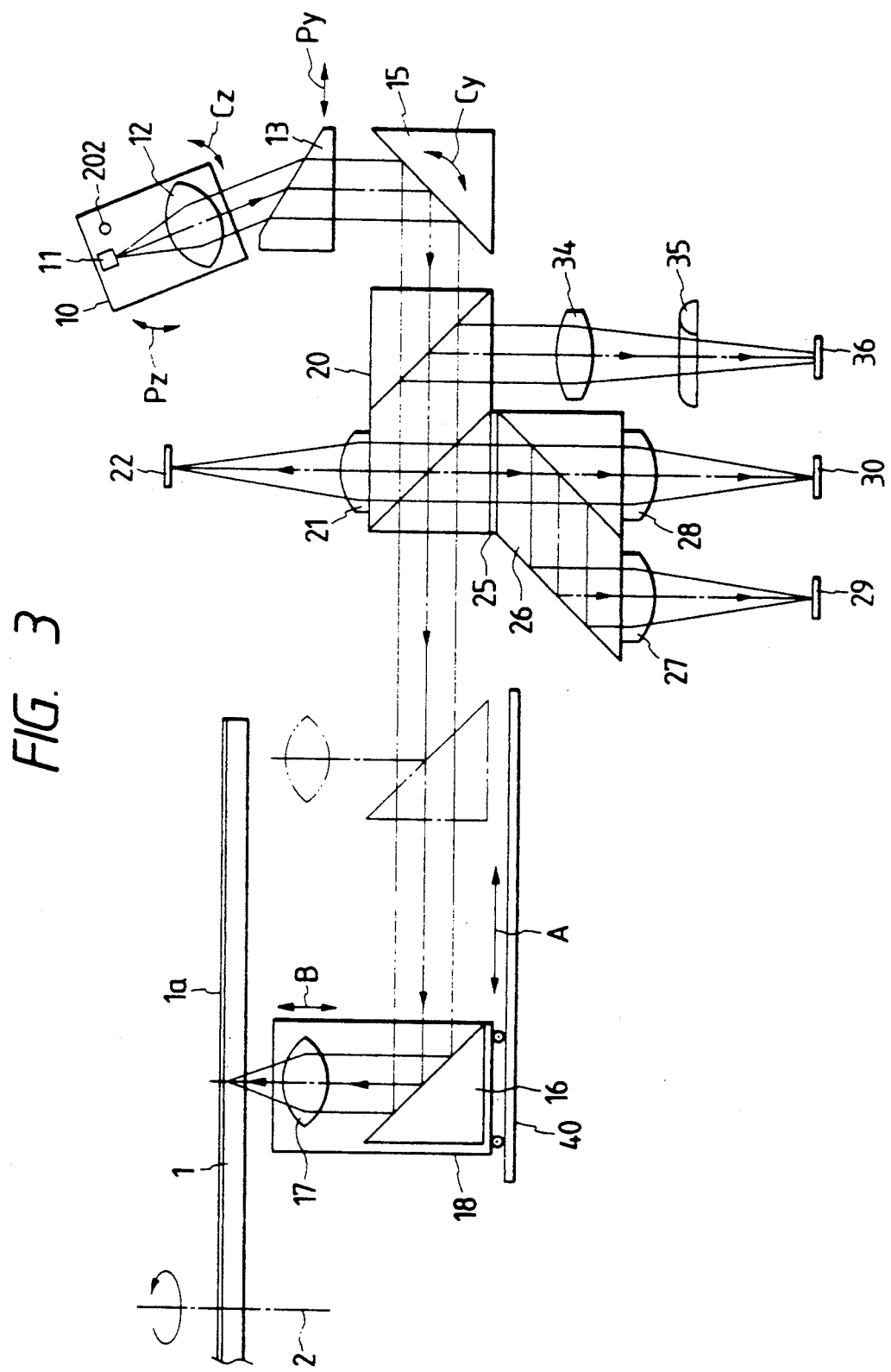

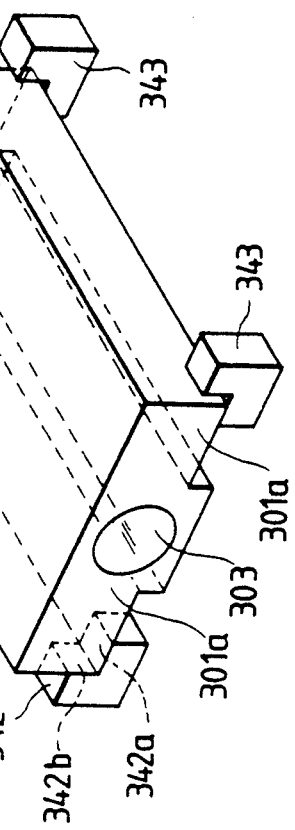
FIG. 26
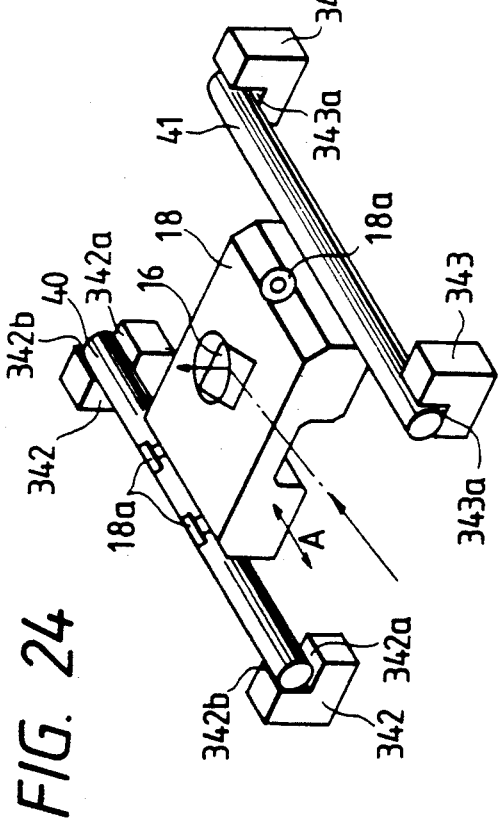
FIG. 24
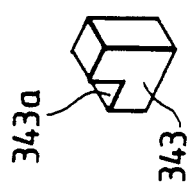
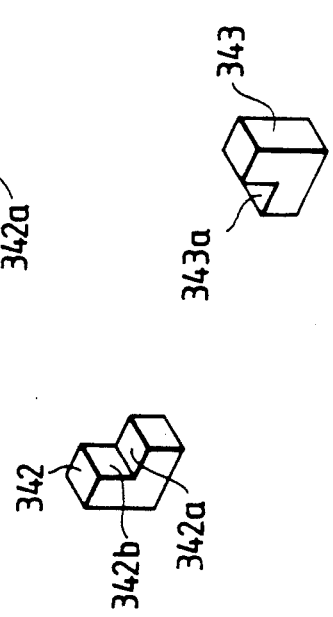
FIG. 25

OPTICAL AXIS ADJUSTING MECHANISM AND METHOD FOR OPTICAL INFORMATION RECORDING AND REPRODUCING DEVICE, AND JIG THEREFOR

CROSS-REFERENCE

This application is a Cip application of U.S. patent application Ser. No. 494,332 filed on Mar. 16, 1990, now abandoned.

BACKGROUND OF THE INVENTION

This invention relates to an optical axis adjusting mechanism of an optical system for an optical information recording and reproducing device which effects the recording and reproduction of information relative to a storage medium such as an optical magnetic disc, using, for example, a laser beam emitted from a laser diode.

This invention also relates to an optical axis adjusting device for a component part such as an optical pickup for an optical disc device, a compact disc player, an optical video disc player, etc.

This invention relates to an optical axis adjusting method for use in an optical system in an optical data recording and reproducing device in which a laser beam outputted by a laser diode or the like is utilized to record data on a recording medium such as a photo-electro-magnetic disk and reproduce data therefrom, and an optical axis adjusting jig for practicing the method.

In a conventional optical information recording and reproducing device of this type, generally, access to a storage medium is achieved by moving a laser diode and an objective optical system in unison. However, in such an arrangement, since the moving portion is heavy, access time is slow. Therefore, recently there has been developed an optical information recording and reproducing device of the so-called separate type, in which only the objective optical system is moved, while the laser diode remains fixed.

However, in such a separate type of device, the objective optical system is moved along a guide rail. As a result, if the inclination of the optical axis of the laser beam relative to the guide rail deviates even slightly, the deviation of the optical axis of the laser beam from the axis of the objective optical system increases as the objective optical system moves along the guide rail, and the intensity distribution deviates from the center. Further, when the optical axis of the laser beam is displaced with respect to the axis of the objective optical system, the intensity distribution also deviates from the center. Any increase in deviation of the intensity distribution adversely affects a servo signal detection system for detecting a signal for a focusing servo and a tracking servo.

Therefore, in order to avoid such adverse effects on the servo signal detection system, it is necessary to adjust accurately the inclination of the optical axis of the laser beam relative to the guide rail, as well as the displacement of the laser beam relative to the axis of the objective optical system.

Conventionally, the inclination and displacement of the laser beam have been adjusted by moving a laser pen (which comprises a laser diode and a collimator lens integrally connected thereto) or the like, so that the inclination and displacement of the laser beam are adjusted together. As a result, if one of the inclination and the displacement is adjusted, the other is also varied in response thereto. This is disadvantageous, in that accurate adjustment of both the inclination and the displacement is expensive and labor-consuming.

In one example of a known approach, in an optical disc device, a laser beam, irradiated from a light source such as a semiconductor laser, is converged and applied to an optical disc through a predetermined optical system so as to record or reproduce information. In order to effect accurate reproduction of the information, it is necessary to adjust the optical system so that the optical axis of the laser beam can be disposed in a predetermined position.

FIG. 1 shows an example of a mechanism for adjusting the angle of an optical axis of the laser beam, emitted from a source such as a semiconductor laser, for disposing the optical axis of the laser beam in a predetermined position. In this FIG., a mounting base 102, on which a reflecting plate 103 is fixedly mounted, is angularly movable relative to a base plate 101, so that the outgoing angle of the laser beam reflected by the reflecting plate 103 can be adjusted.

FIG. 2 shows an example of a mechanism for adjusting the height of the optical axis (that is, for effecting parallel movement thereof). In this FIG., a mounting base 104, having a prism 105 fixedly mounted thereon, is slidable linearly relative to base plate 101. By adjusting the sliding position of the mounting base 104, the position of the beam incident on an inclined surface of the prism 105 is changed, so that the optical axis of the outgoing laser beam from the prism 105 is moved parallel, thereby adjusting its height.

In an optical disc device, such adjustments of the angle and height of the optical axis must be made both in a direction parallel to the optical disc and in a direction perpendicular thereto. As a result, if separate mechanisms are provided for effecting the adjustments of the angle and height, respectively, it is necessary to provide four such mechanisms, making the construction complicated. Moreover, the adjustments in the two directions are not adequately independent of each other, as mentioned above. As a result, after the adjustments in both directions are completed, fine adjustments must be made in the respective planes, which is disadvantageous in that much time is required for the adjustment.

For this reason, there has been proposed a device in which the adjustment is limited to one direction; however, in this case, the degree of precision of an optical component and its associated mounting components must be improved.

Also, the optical data recording and reproducing device of separation type suffers from the following difficulties: In the device, the part of the objective optical system is moved along a guide rail. Therefore, if the inclination of the optical axis of the laser beam with respect to the guide rail deviates from a predetermined value, then as the part of the object optical system moves, the deviation of the laser beam from the axis of the optical system is increased, so that the distribution of intensity is off-centered. When the distribution of intensity is greatly off-centered, then it will adversely affect a servo signal detecting system for detecting focus servo signals and tracking servo signals.

The tolerance in inclination of the optical axis is extremely small, for instance must 2° or smaller. Therefore, it is considerably difficult to adjust the inclination of the optical axis. Accurate adjustment of the inclination of the optical axis requires lots of time and labor.

SUMMARY OF THE INVENTION

The present invention seeks to overcome the above deficiencies. Accordingly, one object of the invention is to provide an optical axis adjusting mechanism of an optical system for an optical information recording and reproducing device, in which the inclination and displacement of the optical axis of a laser beam can be adjusted easily, independently of each other.

This first object has been achieved by an optical axis adjusting mechanism of an optical system for an optical information recording and reproducing device, which includes:

a laser ray source for emitting a laser beam;

a collimator lens for forming the laser beam, emitted from the laser ray source, as a beam of parallel rays;

an anamorphic prism for shaping the configuration of the laser beam passed through the collimator lens;

a guide rail;

an objective optical system, movable on the guide rail, for focusing the laser beam, passed through the anamorphic prism, on a storage medium;

a parallelism adjusting apparatus for adjusting the parallelism of the optical axis of the laser beam with respect to the guide rail; and a displacement amount-adjusting apparatus for adjusting the amount of displacement of the optical axis of the laser beam with respect to the axis of the objective lens;

wherein the two adjustment operations performed by the two just-mentioned apparatuses do not interfere with each other.

In the operation of the invention, the parallelism of the optical axis of the laser beam with respect to the guide rail is adjusted by the parallelism adjusting device, and the amount of displacement of the optical axis of the laser beam with respect to the axis of the objective lens is adjusted by the displacement amount-adjusting device. The operation for adjusting the parallelism and the operation for adjusting the displacement amount can be carried out independently of each other without interfering with each other.

Another object of the invention is to provide a device, having simple construction, and capable of adjusting the optical axis in both directions independently of each other.

According to this aspect of the invention, there is provided an optical axis adjusting device for an optical component, which includes:

an optical component for emitting light;

a base plate;

a unit containing the optical component therein and mounted on the phase plate;

a first support mechanism for supporting the unit so that the unit is displaceable relative to the base plate at least in a first direction and a second direction;

a second support mechanism for supporting the unit so that the distance between the unit and the base plate is variable, the second support mechanism cooperating with the first support mechanism for displacing the unit at least in the first direction; and a third support mechanism for supporting the unit so that the distance between the unit and the base plate is variable, the third support mechanism cooperating with the first support mechanism for displacing the unit at least in the second direction.

The optical component, for example a semiconductor laser, is mounted on the unit. The first support mechanism, such as a fixed pin, and the second and third support mechanisms, such as screws, are mounted respectively between the unit and the base plate. The fixed pin and the screws are arranged so that the line interconnecting the fixed pin and one of the screws is disposed, for example, parallel to the optical axis, and the line interconnecting the fixed pin and the other screw is disposed perpendicular to the optical axis. With this arrangement, when the one screw is adjusted, the unit is displaced (for example, moved angularly) about fulcrums defined respectively by the fixed pin and the other screw, and when the other screw is adjusted, the unit is displaced about fulcrums defined respectively by the fixed pin and the one screw.

Therefore, with simple construction, the adjustments of the optical axis in the two directions can be effected independently of each other.

Another object of this invention is to eliminate the above-described difficulties accompanying a conventional optical axis adjusting method provided for an optical system in an optical data recording and reproducing device. More specifically, an object of the invention is to provide an optical axis adjusting method for an optical system in an optical data recording and reproducing device in which the inclination of the optical axis of a laser beam with respect to its guide rail can be adjusted readily and accurately, and an optical axis adjusting jig for practicing the method.

This object of the invention has been achieved by the provision of a method of adjusting the optical axis of an optical system in an optical data recording and reproducing device in which access is made by moving along a guide rail at least a part of an objective optical system adapted to focus a laser beam on a memory medium which is outputted by a laser beam source; in which, according to the invention, an optical axis adjusting jig with a reflecting surface on the optical path of the laser beam is mounted on mounting members provided for the guide rail in such a manner that the reflecting surface is perpendicular to the guide rail, after an auto collimator is set in such a manner that its optical axis is perpendicular to the reflecting surface, the optical axis of the optical system for the optical data recording and reproducing device is adjusted while the laser beam outputted by the laser beam source and reflected by the reflecting surface of the optical axis adjusting jig is being observed with the auto collimator.

An optical axis adjusting jib is provided, according to the invention, for use in an optical system for an optical data recording and reproducing device in which access is made by moving along a guide rail at least a part of an objective optical system adapted to focus a laser beam on a memory medium which is outputted by a laser beam source, which jig is detachably mounted on mounting members provided for the guide rail, and has on the optical path of the laser beam a reflecting surface perpendicular to the guide rail.

First, the optical axis adjusting jig is mounted on the guide rail mounting members in such a manner that its reflecting surface is perpendicular to the guide rail. Under this condition, the laser beam source is operated to emit a laser beam. When the optical axis of the laser beam is in parallel with the guide rail, the optical axis of the reflected light beam is perpendicular to the reflecting surface. And when the inclination of the optical axis is deviated from the predetermined value, the optical axis of the reflected laser beam is not perpendicular to the reflecting surface. Therefore, the auto collimator is so set that its optical axis is perpendicular to the reflecting surface. In this case, the optical axis of the auto collimator becomes a reference axis in parallel with the guide rail. Thus, the deviation of the optical axis of the reflected laser beam with respect to the reflecting surface of the optical axis adjusting jig from the reference axis; i.e., the inclination of the optical axis of the laser beam outputted by the laser beam source with respect to the guide rail can be observed with the auto collimator thus set. Thus, the inclination of the optical axis of the optical system in the optical data recording and reproducing device can be adjusted while the above-described inclination of the optical axis being observed with the auto collimator.

BRIEF DESCRIPTION OF THE DRAWINGS

Preferred embodiments of the invention now will be described with reference to the drawings, in which:

FIG. 3 is a schematic view of an optical system for an optical information recording and reproducing device according to one embodiment of the invention;

FIG. 24 is an enlarged perspective view showing a guide rail section in the embodiment;

FIG. 25 is an enlarged perspective view showing guide rail mounting members in the embodiment; and FIG. 26 is an enlarged perspective view showing a reference jig mounted on the guide rail mounting members.

DETAILED DESCRIPTION OF THE PREFERRED EMBODIMENTS

Figure 4:
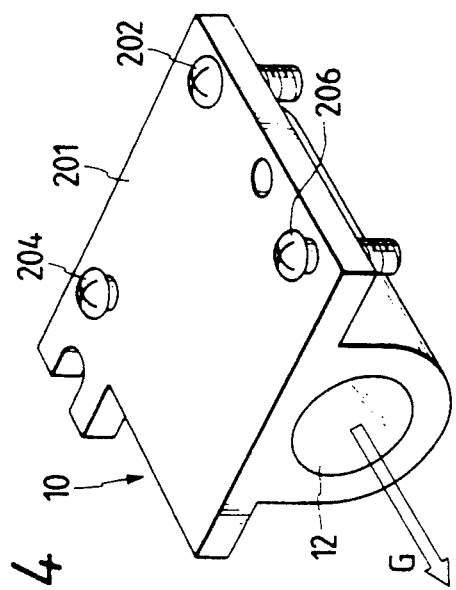
FIG. 4 is an enlarged perspective view of a laser pen used in the invention.

FIG. 3 shows an optical system of an optical information recording and reproducing device in accordance with a first embodiment of the invention. An optical magnetic disc 1, serving as an information storage medium, is rotatable about an axis 2. A laser beam is applied to a magnetic thin film 1a formed on the upper surface of the optical magnetic disc 1, so as to change the direction of magnetization of that portion of the magnetic thin film 1a on which a spot (pit) of the laser beam is formed, thereby storing digital information.

While this approach enables information to be written and read easily, it is necessary to focus the laser beam accurately into a spot of about 1 $\mu$m diameter on the magnetic thin film 1a of the optical magnetic disc 1.

A laser pen 10 contains a laser diode (LD) 11 and a collimator lens 12. The laser diode 11 emits a divergent oval-shaped laser beam. The collimator lens 12 forms the laser beam, emitted from the laser diode 11, as a beam of parallel rays, and a light-emitting point of the laser diode 11 is disposed in the vicinity of the focal point of the collimator lens 12.

An anamorphic prism 13 refracts the incident oval-shaped laser beam only in a direction parallel to the junction surface of the laser diode 11 (i.e. in the direction of the plane of the sheet of FIG. 3) and enlarges it, so that a circular-shaped laser beam of a circular cross-section exits the anamorphic prism 13.

A fixed mirror 15 and a movable mirror 16 are disposed in opposed relation to each other. The laser beam passing through the anamorphic prism 13 is reflected by the fixed mirror 15 and then is reflected by the movable mirror 16. The reflected beam then passes through an objective lens 17, so that the laser beam is focused on the magnetic thin film 1a of the optical magnetic disc 1.

The movable mirror 16 and the objective lens 17 are mounted integrally on a carriage 18, and are movable along a guide rail 40 extending in the radial direction of the optical magnetic disc 1. Therefore, the objective lens 17 can gain access to the optical magnetic disc 1.

A beam splitter 20 is fixed between the fixed mirror 15 and the movable mirror 16. The beam entering the beam splitter 20 from the side of the fixed mirror 15 is split, and is passed through a first condenser lens 21 to be focused on a first photoelectric element 22 for monitoring an laser output.

The beam passing through the beam splitter 20 and reflected by the optical magnetic disc 1 is returned to the beam splitter 20. The beam split here passes through a half wavelength plate 25, and the direction of the deflection plane is turned 45°. Then, using an auxiliary beam splitter 26, the beam is split further by a polarization reflecting surface disposed at an angle of 45° with respect to the polarization direction, so that the beams pass respectively through second and third condenser lenses 27 and 28 and are focused respectively on a second photoelectric element 29 for S-polarization intensity detection, and on a third photoelectric element 30 for P-polarization intensity detection. The reading of the information is effected by output signals of the second and third photoelectric elements 29 and 30.

The reflected beam, fed from the optical magnetic disc 1 and split by another semi-transparent surface of the beam splitter 20, passes through a fourth condenser lens 34 and a cylindrical lens 35, and is focused on a fourth photoelectric element 36 which outputs a servo signal for effecting focusing and the tracking. The focusing servo causes the objective lens 17 to move finely in a direction B, perpendicular to the plane of the optical magnetic disc 1, so that the minimum spot of the laser beam is focused on the surface of the magnetic thin film 1a of the optical magnetic disc 1. The tracking servo causes the objective lens 17 to move finely in a direction A, perpendicular to information recording tracks of the optical disc 1, so as to control the laser beam such that the laser beam will not become displaced out of the track. In this embodiment, a light receiving surface of the fourth photoelectric element 36 is divided, for example, into four or more parts, and the signal for the focusing servo and the tracking servo is obtained by combining signals from the various parts.

Next, the laser pen 10 will be described further with reference to FIGS. 4 to 7. Here, the direction perpendicular to the laser optical axis and parallel to the plane of the sheet of FIG. 3 is defined as a y-direction, and the direction perpendicular to the plane of this sheet is defined as a z-direction.

Figure 5:
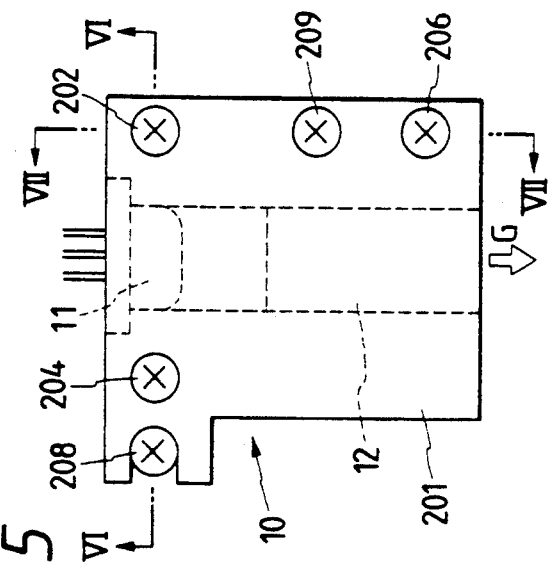
FIG. 5 is a plan view of the laser pen of FIG. 4.
Figure 6:
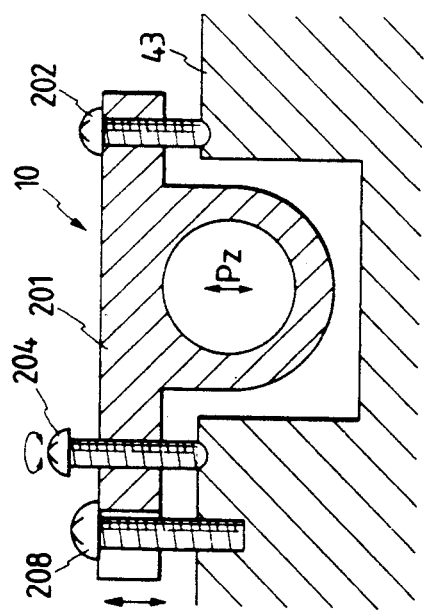
FIG. 6 is a cross-sectional view taken along the line VI—VI of FIG. 5.
Figure 7:
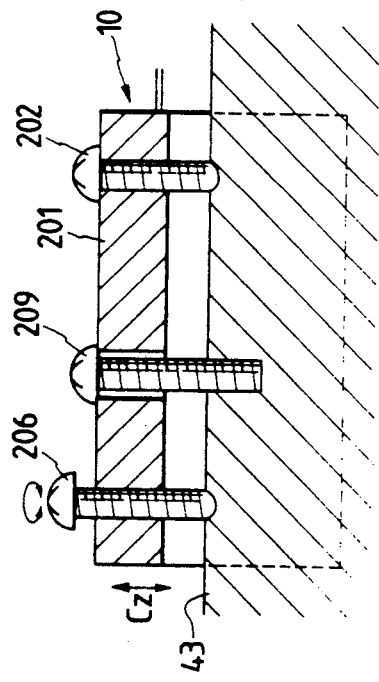
FIG. 7 is a cross-sectional view taken along the line VII—VII of FIG. 5.

FIG. 4 is an enlarged perspective view of the laser pen 10, FIG. 5 is a plan view thereof, FIG. 6 is a cross-sectional view taken along the line VI—VI of FIG. 5, and FIG. 7 is a cross-sectional view taken along the line VII—VII of FIG. 5.

The laser pen 10 includes a laser pen body 201 having a through hole, the collimator lens 12 being fitted in a distal end portion of this through hole, and the laser diode 11 being fitted in a proximal end portion of the through hole such that the laser emitting point of the diode 11 is disposed in the vicinity of the focal position of the collimator lens 12. The laser pen 10 is adapted to be fixed to a base plate 43 by fixing screws 208 and 209, and the laser beam is emitted from the distal end of the laser pen in a direction of arrow G.

A fulcrum screw 202 provides a fulcrum for changing the posture of the laser pen 10. This screw is threaded into the laser pen body 201 at a position near one rear corner thereof, and the distal end of this screw is abutted against the base plate 43.

A z-direction displacement-adjusting screw 204 adjusts the displacement in the z-direction perpendicular to the plane of the sheet. This screw is threaded into the laser pen body 201 on that side of the optical axis opposite to the fulcrum screw, and is abutted at its distal end against the base plate 43.

A z-direction inclination-adjusting screw 206 adjusts the inclination in the z-direction. This screw is threaded into the laser pen body 201 at a position disposed near a front corner thereof on that side of the optical axis where the fulcrum screw 202 is disposed, the distal end of the screw 206 being abutted against the base plate 43.

Figure 1:
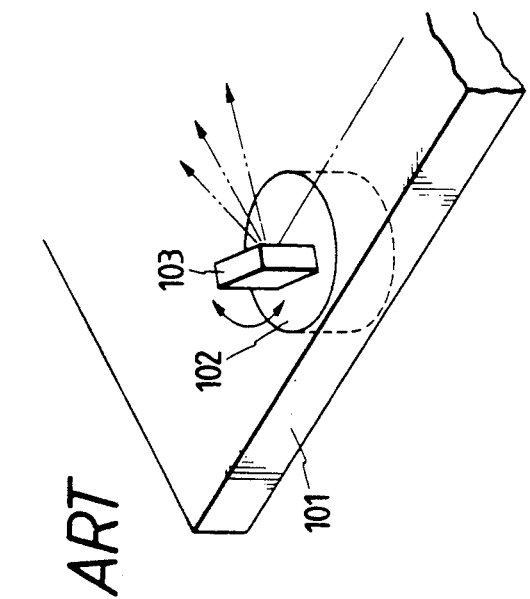
FIG. 1 is a perspective view of a conventional optical axis adjusting device.
Figure 2:
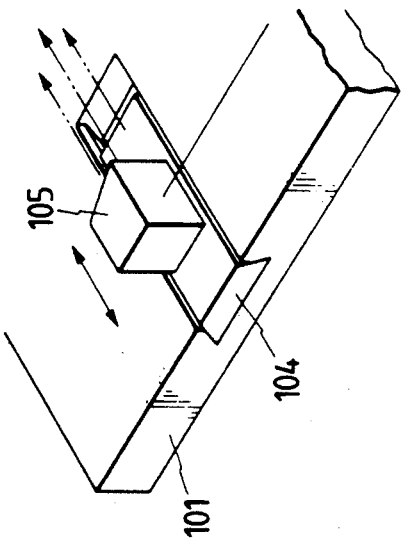
FIG. 2 is a perspective view of another conventional optical axis adjusting device.

Therefore, the fixing screws 208 and 209 are loosened, and in this condition the z-direction displacement-adjusting screw 204 is adjusted as shown in FIG. 6, so that the laser pen 10 is moved angularly about the point of contact between the fulcrum screw 202 and the base plate 43 in the direction of the axis of the z-direction displacement-adjusting screw 204. As a result of this angular movement, the axis of the laser pen 10 makes a parallel movement only in a direction of arrow Pz (FIG. 3), that is, in the direction perpendicular to the plane of the sheet of FIG. 1. As a result, the amount of displacement of the optical axis of the laser beam with respect to the axis of the objective lens 17 can be adjusted only in the z-direction (i.e., the direction perpendicular to the plane of the sheet of FIG. 3).

Although such angular movement causes the laser pen 10 also to be displaced in the direction of the plane of the sheet of FIG. 3 (i.e., the y-direction), the amount of such displacement is very small.

Also, when the z-direction inclination-adjusting screw 206 is adjusted as shown in FIG. 7, the laser pen 10 is moved angularly about the point of contact between the fulcrum screw 202 and the base plate 43 in the direction of the axis of the z-direction inclination-adjusting screw 206. As a result of this angular movement, the inclination of the axis of the laser pen 10 is changed only in a direction of arrow Cz (FIG. 3), that is, in the direction perpendicular to the plane of the sheet of FIG. 3. As a result, the parallelism of the laser beam with respect to the guide rail 40 can be adjusted in the z-direction (i.e., the direction perpendicular to the plane of the sheet of FIG. 3).

After adjusting the displacement amount and parallelism of the laser beam by the change of the posture of the laser pen, the fixing screws 208 and 209 are tightened relative to the base plate 43 to fix the laser pen 10.

A mounting portion for the anamorphic prism 13 now will be described with reference to FIGS. 3 and 8 to 11.

Figure 8:
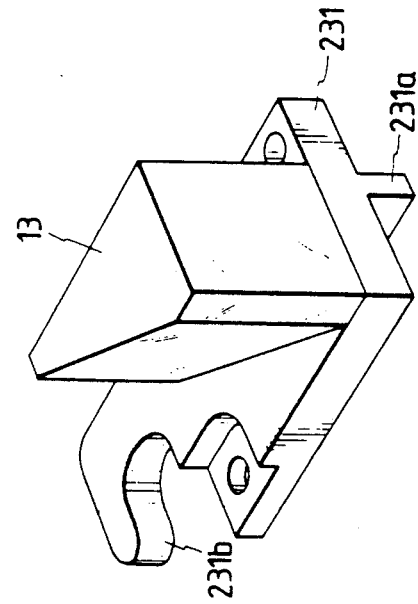
FIG. 8 is an enlarged perspective view of an anamorphic prism also used in the invention.
Figure 9:
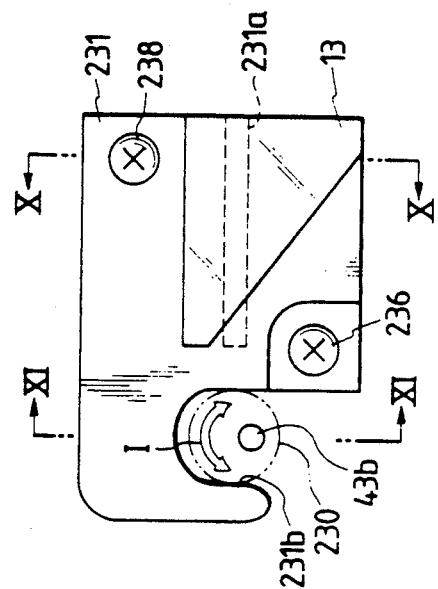
FIG. 9 is a plan view of the anamorphic prism of FIG. 8.
Figure 10:
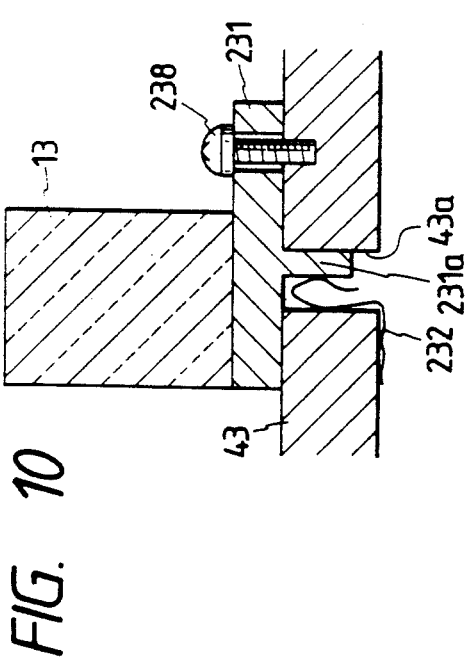
FIG. 10 is a cross-sectional view taken along the line IX—IX of FIG. 8.
Figure 11:
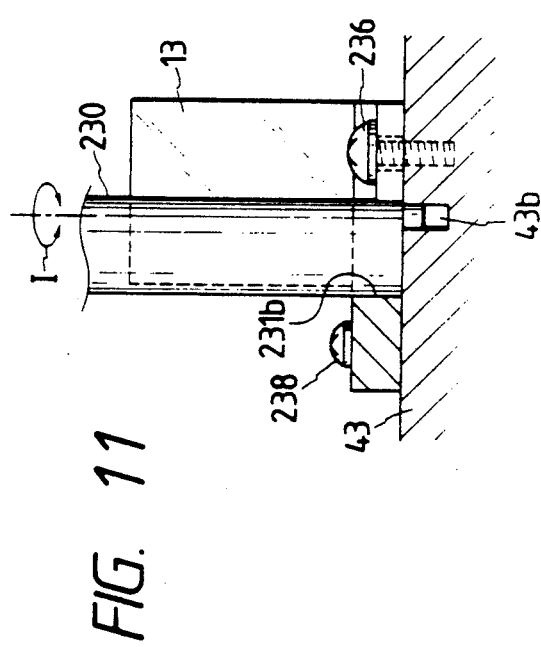
FIG. 11 is a cross-sectional view taken along the line X—X of FIG. 8.

FIG. 8 is an enlarged perspective view of the mounting portion for the anamorphic prism 13, FIG. 9 is a plan view thereof, FIG. 10 is a cross-sectional view taken along the line X—X of FIG. 9, and FIG. 11 is a cross-sectional view taken along the line XI—XI of FIG. 9.

A displacement adjusting rod 230 has a cylindrical projection formed on its distal end in an eccentric manner. The anamorphic prism 13 is fixed to a support base 231 which has a plate-like projection 231a formed on a lower surface thereof, the plane of the support base 231a being parallel to the laser beam outgoing surface of the anamorphic prism 13. A recess 231b is formed in the support base 231, the displacement adjusting rod 230 being engageable in this recess.

A groove 43a receives the projection 231a therein, and the projection 231a is pressed against a wall of the base plate 43 by a spring 232, so that the support base 231 can be moved parallel to the laser beam-outgoing surface of the anamorphic prism 13. A small hole 43b receives the projection of the displacement adjusting rod 230. Fixing screws 236 and 238 fix the support base 231 to the base plate 43.

Figure 12:
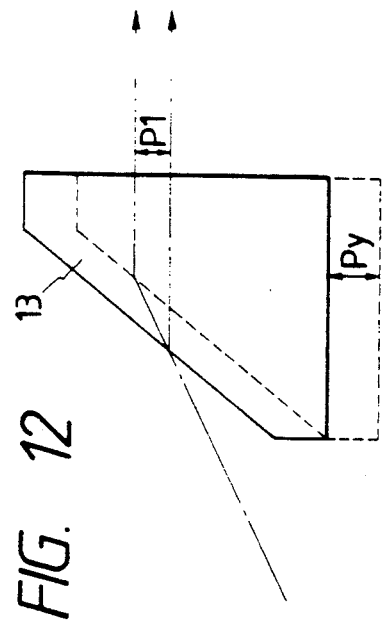
FIGS. 12 and 13 are views describing the illustrating movement of the optical axis caused by the movement of the anamorphic prism of FIG. 8 in two respective directions.

The projection of the displacement adjusting rod 230 is inserted into the small hole 43b, as shown in FIG. 11. Then, when the displacement adjusting rod 230 is rotated as indicated by arrow I (FIG. 9), the anamorphic prism 13 is moved in a direction of arrow Py parallel to its beam outgoing surface, as shown in FIG. 12, so that the laser beam is moved in a direction of arrow Pl parallel to the arrow Py. In FIG. 3, the direction of the arrow Py is parallel to the plane of the sheet of FIG. 1. Therefore, by moving the anamorphic prism 13 in the direction of the arrow Py, the amount of displacement of the laser beam with respect to the axis of the objective lens 17 can be adjusted in the y-direction (i.e., the direction of the plane of the sheet of FIG. 3).

Thus, when the adjustment of the amount of displacement of the laser beam by the movement of the anamorphic prism 13 is completed, the fixing screws 236 and 238 are tightened relative to the base plate 43 to fix the anamorphic prism 13.

Figure 13:
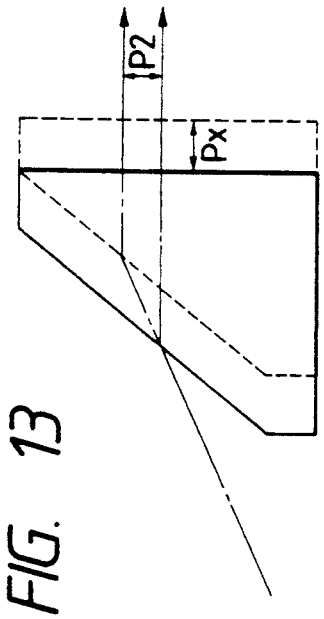

The anamorphic prism 13 may be designed to be moved in any direction, for example, a direction of arrow Px (FIG. 13), that is, in a direction perpendicular to the beam emission surface, in which case the laser beam can also move in a direction (arrow P2) parallel to the arrow Py.

Figure 16:
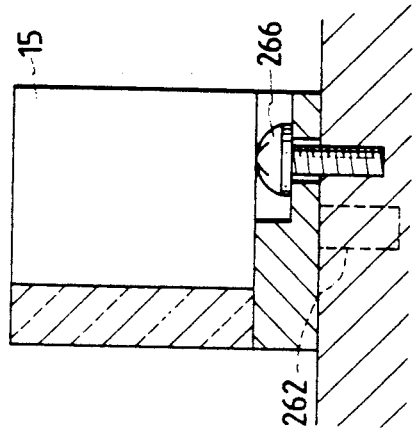
FIG. 16 is a cross-sectional view taken along the line XVI—XVI of FIG. 15.
Figure 14:
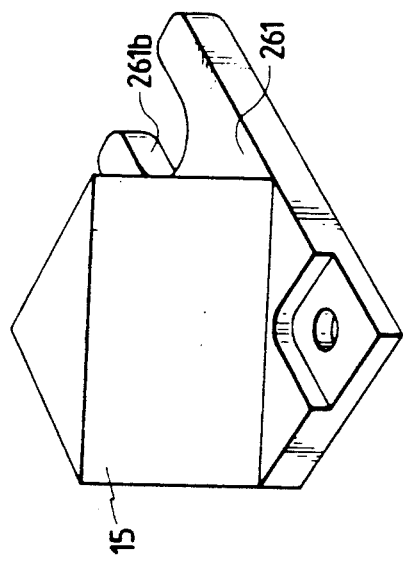
FIG. 14 is an enlarged perspective view of a fixed prism also used in the invention.

The fixed mirror 15 now will be described with reference to FIGS. 3 and 14 to 18. FIG. 14 is an enlarged perspective view of the fixed mirror 15, FIG. 15 is a plan view thereof, FIG. 16 is a cross-sectional view taken along the line XVI—XVI of FIG. 15, and FIG. 17 is a cross-sectional view taken along the line XVII—XVII of FIG. 15.

An inclination adjusting rod 260 has a cylindrical projection formed on its distal end in an eccentric manner. The fixed mirror 15 is secured to a support base 261 which has a recess 261b formed therein, the inclination adjusting rod 260 being engaged in the recess 261b. A pin 262 projects downwardly from the support base 261.

A small hole 43c is formed in the base plate 43, and the pin 262 is rotatably received in this small hole. A small hole 43d receives the projection of the inclination adjusting rod 260. Fixing screws 266 and 268 fix the support base 261 to the base plate 43.

Figure 17:
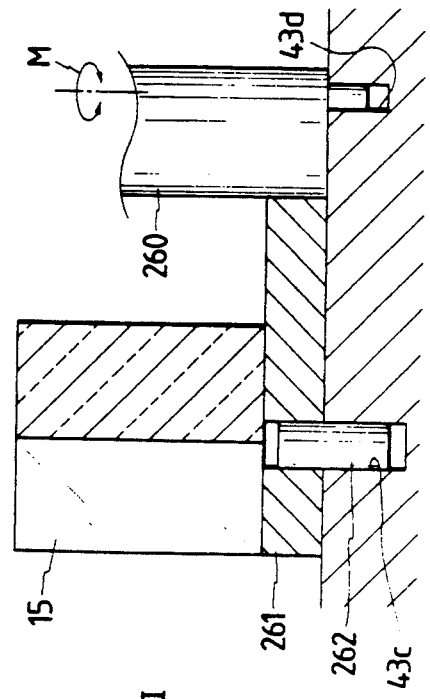
FIG. 17 is a cross-sectional view taken along the line XVII—XVII of FIG. 15.
Figure 15:
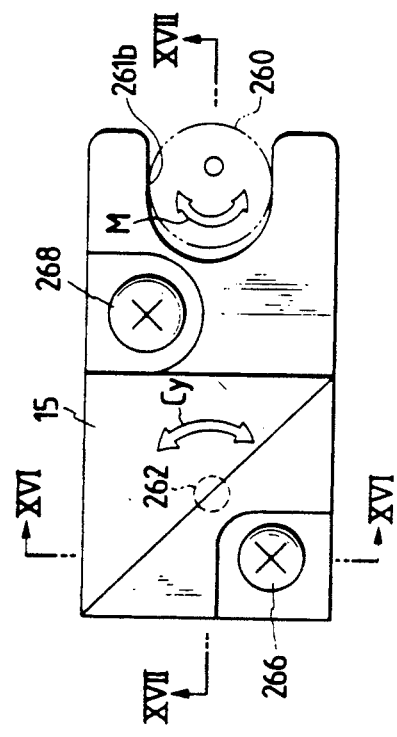
FIG. 15 is a plan view of the fixed prism of FIG. 14.
Figure 18:
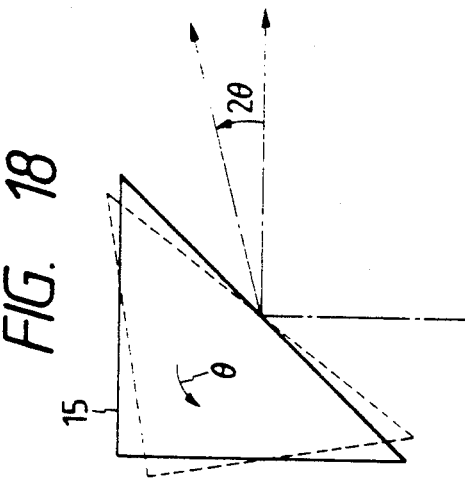
FIG. 18 is a view describing the inclination of the optical axis caused by the rotation of the fixed prism of FIG. 15.

The inclination adjusting rod 260 is inserted into the small hole 43d as shown in FIG. 17, and the inclination adjusting rod 260 is rotated in a direction of arrow M as shown in FIG. 15, so that the fixed mirror 15 is rotated about the axis of the pin 262 in a direction of arrow Cy. In accordance with the angle $\theta$ of this rotation (FIG. 18), the reflection optical axis is inclined at an angle $2\theta$, as shown in FIG. 18. The direction of such inclination of the optical axis is parallel to the plane of the sheet of FIG. 3. Therefore, when the fixed mirror 15 is rotated in the direction of the arrow Cy, the laser beam is inclined in the direction of the arrow Cy, so that the degree of parallelism of the optical axis of the laser beam with respect to the guide rail 40 can be adjusted in the y-direction (i.e., the direction of the plane of the sheet of FIG. 3).

Thus, in this embodiment, with the change of the posture of the laser pen 10 in the C direction and with the rotation of the fixed mirror 15 in the Cy direction, the parallelism of the optical axis of the laser beam with respect to the guide rail 40 can be adjusted both in the z-direction and the y-direction. With the change of the posture of the laser pen 10 in the Pz direction and with the parallel movement of the anamorphic prism 13 in the Py direction, the amount of displacement of the optical axis of the laser beam with respect to the axis of the objective lens 17 can be adjusted both in the z-direction and the y-direction. In addition, the adjustment of the displacement amount and the adjustment of the parallelism can be carried out without the adjustments interfering with each other.

In the optical axis adjusting mechanism of the optical system for the optical information recording and reproducing device according to the just-described embodiment of the invention, the operation for adjusting the parallelism of the optical axis of the laser beam with respect to the guide rail and the operation for adjusting the amount of displacement of the optical axis of the laser beam with respect to the axis of the objective lens can be carried out independently of each other without interfering with each other. Therefore, there is achieved an excellent advantage in that its inclination and the amount of displacement can be adjusted easily and accurately.

Figure 19:
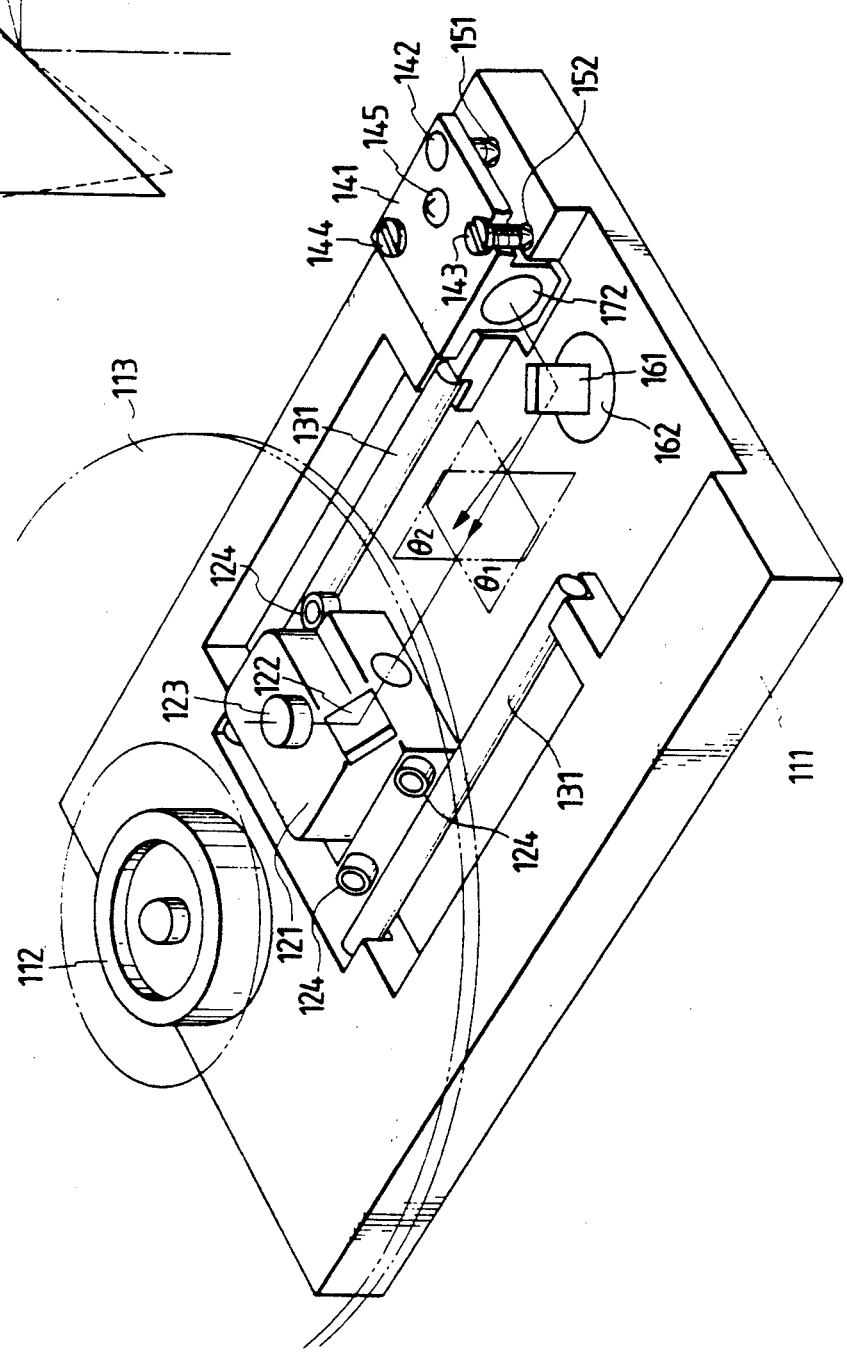
FIG. 19 a perspective view of an optical information recording and reproducing device incorporating an optical axis adjusting device for an optical component according to another preferred embodiment of the invention.

FIG. 19 shows an optical information recording and reproducing device incorporating a device for adjusting the optical axis of an optical component according to another embodiment of the invention. In this FIG., a turntable 112 is mounted rotatably on a base plate 111 such as a chassis. A disc 113 serving as a recording medium is placed on the turntable 112 for rotation therewith. A movable portion 121 has both a mirror 122 and an objective lens 123 mounted therein. Rollers 124 are rotatably mounted on the outside of this movable portion, and are held in rolling engagement with rails 131.

Figure 21:
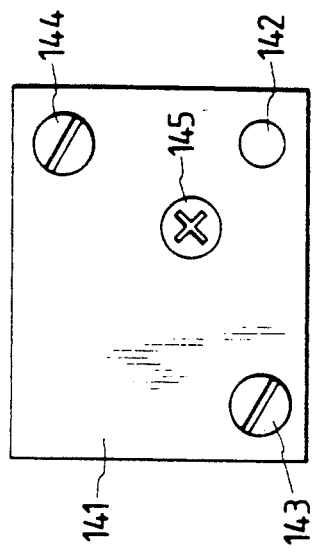
FIG. 21 is a plan view of the unit of FIG. 20.
Figure 20:
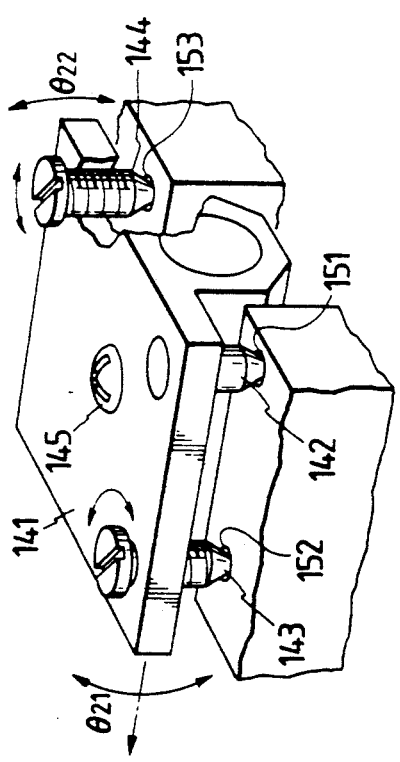
FIG. 20 is a perspective view of a adjustment unit according to the invention.
Figure 22:
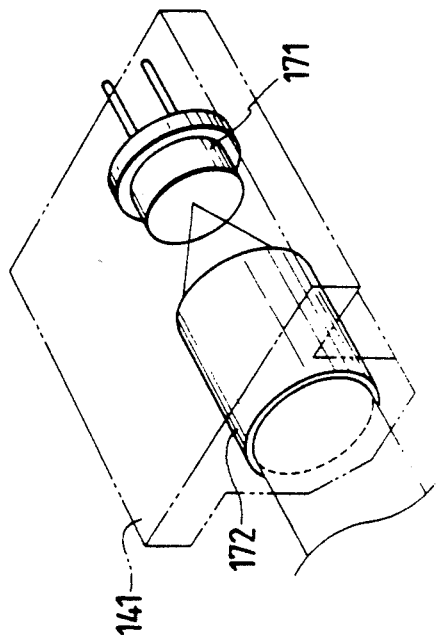
FIG. 22 is a perspective view describing the interior of the adjustment unit of the present invention.

An adjustment unit 141 in FIG. 19 is shown in detail in FIGS. 20 and 21. A pin 142 is fixed to the unit 141, and screws 143 and 144 are threaded into the unit 141 as a screw 145 fixes the unit 141 to the base plate 111. For example, as shown in FIG. 22, the unit 141 contains a semiconductor laser 171 serving as a light source, a collimator lens 172 for converting the laser beam, emitted from the semiconductor laser 171, into a beam of parallel rays, and so on.

As shown in FIG. 21, the pin 142 and the screw 143 are arranged so that the line interconnecting the pin 142 and the screw 143 is disposed substantially parallel to the optical axis of the laser beam emitted from the semiconductor laser 171 via the collimator lens 172. Also, the screw 144 is so arranged that the line interconnecting the pin 142 and the screw 144 is disposed substantially perpendicular to the optical axis. Conical recesses 151, 152 and 153 are formed in the base plate 111, and the distal ends of the pin 142 and screws 143 and 144 are abutted against the surfaces of these recesses, respectively. A mirror 161 is secured fixedly to a mounting base 162 which is angularly movably mounted on the base plate 111.

The laser beam emitted from the semiconductor laser 171 is converted by the collimator lens 172 into a beam of parallel rays, and then is incident on the mirror 161. The laser beam reflected by the mirror 161 is incident on the mirror 121, and is reflected thereby, the thus-reflected beam being incident on the objective lens 123. The laser incident on the objective lens 123 is converged and applied to the disc 113.

The movable portion 121 is moved by a motor (not shown) in the radial direction of the disc. At this time, the rollers 124 are guided by the rails 131, thereby moving the movable portion 121 smoothly. With this movement of the movable portion 121 in the radial direction of the disc, access to a selected track on the disc 113 can be achieved.

When the optical axis of the laser beam is to be adjusted in a plane $\theta 2$ (FIG. 19) perpendicular to the disc 113, the screw 143 is first moved forward or backward relative to the unit 141 to adjust the distance between the unit 141 and the base plate 111. At this time, the unit 141 is moved angularly in a direction $\theta 21$ (FIG. 20) about a fulcrum defined by the point of contact between the pin 142 and the recess 151, and also about a fulcrum defined by the point of contact between the screw 144 and the recess 153. As a result, the angle of the optical axis of the laser beam in the plane $\theta 2$ is adjusted.

On the other hand, when the screw 144 is moved forward or backward relative to the unit 141 to adjust the distance between the unit and the base plate 111, the unit 141 is moved angularly in a direction $\theta 22$ (FIG. 20) about a fulcrum defined by the point of contact between the pin 142 and the recess 151, and also about a fulcrum defined by the point of contact between the screw 143 and the recess 152. As a result, the optical axis of the laser beam is moved parallel (that is, adjusted in height) in the plane $\theta 2$. Although strictly speaking, the unit 141 also is moved angularly, the distance of this movement is very small, and therefore this movement can practically be considered as a linear movement.

Since the line interconnecting the screw 143 and the pin 142 is perpendicular to the line interconnecting the screw 144 and the pin 142, the adjustment in one of the directions hardly affects or influences the adjustment in the other direction.

After the adjustments are completed, the screw 145 is threaded into the base plate 111 to fix the unit 141 to the base plate 111.

When the angle of the optical axis is to be adjusted in a plane $\theta 1$ (FIG. 19) parallel to the disc 113, the mounting base 162 is adjustably moved angularly relative to the base plate 111. As a result, the angle of the laser beam reflected by the mirror 161 is changed in the plane $\theta 1$.

As described above, according to this embodiment of the present invention, the unit is supported by one of the three support mechanisms so as to be displaced in two directions, and the unit is supported by the other two support mechanisms so as to be displaced in one of the two directions and in the other direction, respectively. Therefore, without complicated construction, the optical axis can be adjusted in the two directions independently of each other.

Another preferred embodiment of this invention will be described with reference to FIGS. 23 to 25.

While the invention has been described in detail with reference to several preferred embodiments, various changes within the spirit of the invention will be apparent to those of working skill in this technological field. Consequently, the invention should be considered as limited only by the scope of the appended claims.

Reference numeral 18 designates a carriage on which the movable mirror 16 and the objective lens 17 are mounted. The carriage 18, as shown in FIG. 24, has a plurality of wheels 18a (three wheels for instance) which are provided on opposite sides of the carriage. In FIG. 24, the objective lens 17 is not shown.

In FIG. 24, reference numerals 40 and 41 designate a reference guide rail and an auxiliary guide rail, respectively, which are circular cylinders equal in diameter to each other. In this case, two of the three wheels 18a are engaged with the reference guide rail 40, and the remaining wheel 18a is engaged with the auxiliary guide rail 41. That is, the carriage 18 is supported on the guide rails 40 and 41 through the wheels 18a. The carriage 18 is moved in the direction parallel the arrow A, which corresponds to the radial direction of the disk 1.

Further in FIG. 24, reference numerals 342 and 343 designate a pair of reference mounting members and a pair of auxiliary mounting members, respectively, which are to detachably mount the reference guide rail 40 and the auxiliary guide rail 41. Those mounting members 342 and 343 are mounted on a base 300, which is adapted to fixedly secure the optical element of the optical system for the optical data recording and reproducing device. Each of the reference mounting members 342 has a horizontal seat 342a for supporting the reference guide rail 40 from below, and a vertical seal 342b for supporting it from side in such a manner that the guide rail 40 is in close contact with the horizontal and vertical seats 342a and 342b. Each of the auxiliary mounting members 343 has a horizontal seat 343 for supporting the auxiliary guide rail 41 from below. The horizontal seats 343a of the auxiliary mounting members 343 are flush with the horizontal seats 342a of the reference mounting members 342.

Figure 23:
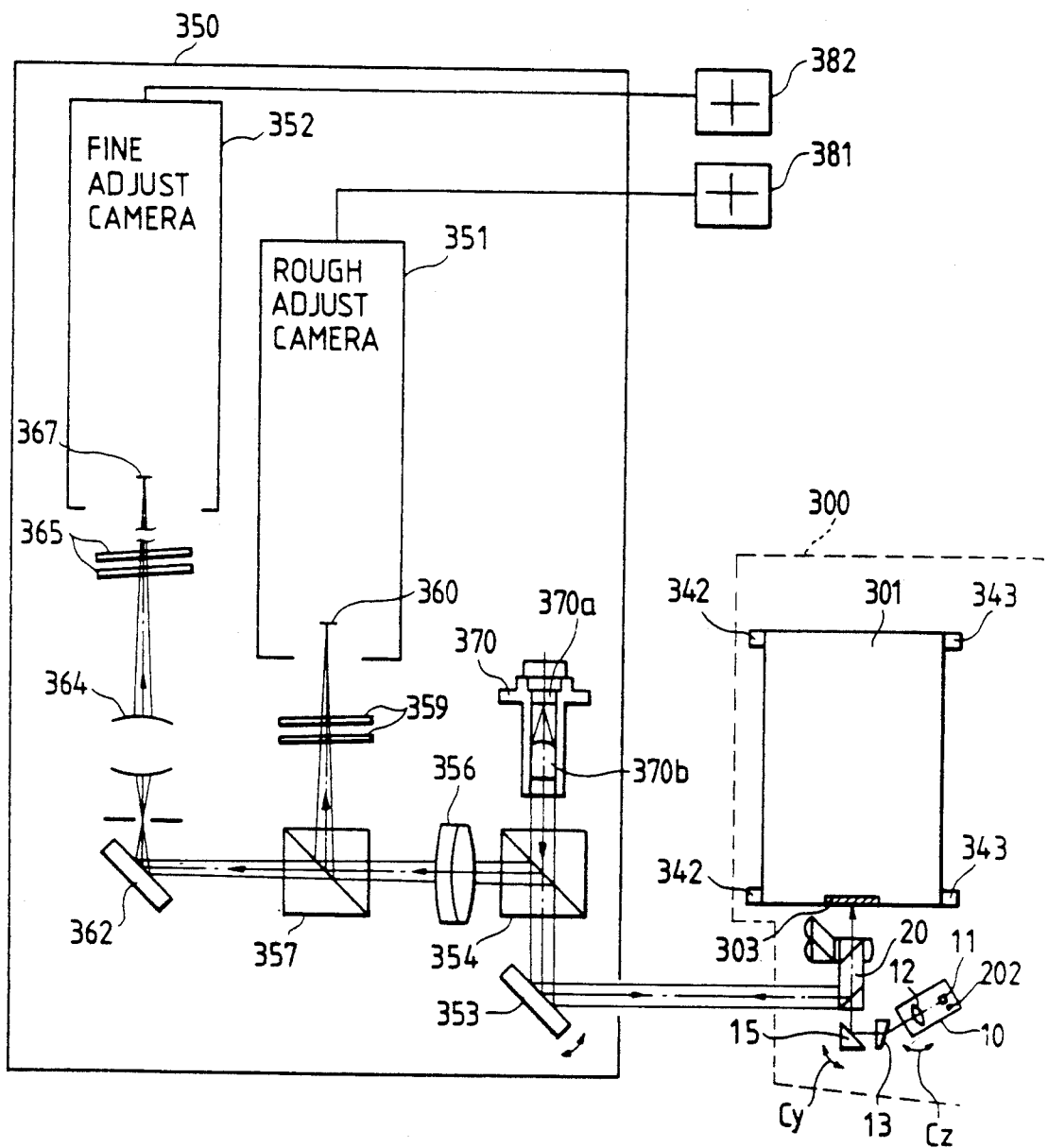
FIG. 23 is a diagram outlining the arrangement of one embodiment of this invention.

FIG. 23 shows an optical axis adjusting device.

In FIG. 23, reference numeral 350 designates an auto collimator optical system. The auto collimator optical system 350 includes an adjusting mirror 353 which is adapted to change the direction of a light beam emerging from the auto collimator optical system 350. The light beam reflected from a reference reflecting surface 303 is changed in direction by a first beam splitter, and decreased in diameter by an objective lens 356, and then split into two light beams by a second beam splitter 357.

One of the two light beams, which has been reflected from a translucent surface of the second beam splitter 357, is image-formed on the image forming surface 360 of a coarse adjustment TV camera 351. The other light beam, which has passed through the translucent surface of the second beam splitter 357, is reflected by a mirror 362, and is then image-formed on the image forming surface of a fine adjustment TV camera 352 by an enlarging objective lens 364.

The image formed in the fine adjustment TV camera 352 is larger in magnification than that formed in the coarse adjustment TV camera 351. Accordingly, the fine adjustment TV camera 352 is higher in the accuracy of measurement than the coarse adjustment TV camera 351. In FIG. 23, reference numerals 359 and 365 designate polarizing filters which are rotated around their own optical axes to adjust the quantities of light, respectively.

Further in FIG. 23, reference numeral 370 designates an auxiliary laser pen provided as a light source for the auto collimator optical system 350; 370a, an auxiliary laser diode which is the light source body; and 370b, a collimator lens. The light emitting point of the auxiliary laser diode 370a is positioned in conjugation with the reference points (central positions) of the image forming surfaces 360 and 367 of the two TV cameras 351 and 352. The output laser beam of the auxiliary laser pen 370 is passed through the first beam splitter 354 and reflected by the adjusting mirror 353, so that it is allowed to emerge out of the auto collimator optical system 350. The laser beam is passed through the beam splitter 20 and reflected by the reflecting surface 303, so that it is returned to the auto collimator optical system 350. The laser beam thus returned is reflected by the beam splitter 354 and is then image-formed in the coarse adjustment TV camera 351 and the fine adjustment TV camera 352. Under this condition, while the output spots are being observed with a coarse adjustment monitor 381 and a fine adjustment monitor 382 which are provided with scaled screens, the reflecting mirror 353 is turned until the output spots on the screens of the two monitors 381 and 382 come to the central positions of the scales, respectively; that is, the output laser beam of the auxiliary laser pen 370 is applied perpendicular to the reference reflecting surface 303.

Referring to FIGS. 23 and 26, reference numeral 301 designates a reference jig for adjusting the optical axis of the laser beam. The reference jig 301 is mounted on the mounting members 342 and 343 with the guide rails 40 and 41 removed. The reference reflecting surface 303 is provided on the (front) side of the reference jig 301 so as to reflect the laser beam which is outputted by the laser diode 11 and passed through the beam splitter 20. The reference reflecting surface 303 is so formed that it is perpendicular to the bottom surface 301a and one side surface 301b of the reference jig 301. Hence, when the bottom surface 301a and the side surface 301b of the reference jig 301 are held in close contact with the horizontal seats 342a and 343a and the vertical seats 342b of the mounting 342 and 343, then guaranteed to be disposed on a plane which the reference reflecting surface 303 is fused perpendicular to the reference guide rail 40 when the guide rails are subsequently secured to the mounting member.

In this connection, it should be noted that there is a small gap between the opposite side surface 301b of the reference jig 301 and the auxiliary mounting members 343.

An optical axis adjusting method according to the invention will be described.

First, as shown in FIG. 25, the reference guide rail 40 and the auxiliary guide rail 41 are removed from the mounting members 342 and 343. Under this condition, the reference jig 301 is mounted on the mounting members 342 and 343 as shown in FIG. 26, in such a manner that the reference reflecting surface 303 faces towards the beam splitter 20 and the bottom surface 301a of the reference jig 301 is in close contact with the horizontal seats 342a and 343a while the one side surface 301b of the reference jig 301 is in close contact with the vertical seats 342b of the mounting members 342. That is, the reference reflecting surface 303 is perpendicular to the reference guide rail as was described above.

After the reference jib 301 has been mounted in the above-described manner, the auto collimator optical system 350 is so set that, as shown in FIG. 23, the light beam reflected from the reference reflecting surface 303 is reflected by the translucent surface of the beam splitter 20 so that it enters the auto collimator optical system 350. Under this condition, the auxiliary laser pen 370 is caused to emit a laser beam, and the alignment is carried out; that is, the adjusting mirror 353 is turned until the optical axis of the laser beam thus emitted becomes perpendicular to the reference reflecting surface 303. If summarized, the auto collimator optical system 350 is so set that its optical axis is perpendicular to the reference reflecting surfacer 303.

After completion of the alignment, the laser diode 11 is activated to emit a laser beam. The laser beam thus emitted is reflected by the reference reflecting surface 303 towards the beam splitter 20, thus entering the auto collimator optical system 350. As a result, the laser beam is observed with the coarse adjustment monitor 381 and the fine adjustment monitor 382.

The reference reflecting surface 303 is perpendicular to the reference guide rail 40. Therefore, when the output laser beam of the laser diode 11 is completely in parallel with the reference guide rail 40, then the optical axis of the beam reflected by the reference reflecting surface 303 coincides completely with the optical axis of the auto collimator optical system, so that the spots are observed at the reference points of the scales in the monitors 381 and 381, respectively.

In the case where, in the coarse adjustment monitor 381 and the fine adjustment monitor 382, the spots are not formed at the reference points, the following adjustment is carried out: First, while the spot is being observed with the coarse adjustment monitor 381, the laser pen 10 and/or the fixed mirror 15 is changed so as to roughly adjust the inclination of the optical axis of the laser beam outputted by the laser diode 11, and then while the spot is being observed with the fine adjustment monitor 382, the laser pen 10 and/or the fixed mirror 15 is changed in posture, to finely adjust the inclination of the optical axis of the laser beam.

With the laser pen 10, the inclination of the laser beam can be adjusted as follows. As described before, when the laser pen 10 is turned about a fulcrum 202 in the direction of the arrow Cz, that is, the inclination of the laser beam is adjusted in a direction perpendicular to the surface of the drawing of FIG. 3 with respect to the reference guide rail 40.

With the stationary mirror 15, the inclination of the laser beam can be adjusted as follows: When stationary mirror and accordingly its reflecting surface is turned in the direction of the arrow Cy; i.e., along the surface of the drawing of FIG. 3, the inclination of the laser beam is adjusted along the surface of the drawing with respect to the reference guide rail 40.

In the optical axis adjusting method according to the invention, the inclination of the optical axis of the optical system for the optical data recording and reproducing device with respect to the reference guide rail can be adjusted while the inclination of the optical axis of the laser beam outputted by the laser beam source is being observed with the auto collimator.

With the optical axis adjusting jig simple in structure which is mounted on the guide rail mounting members with the guide rails removed therefrom, the inclination of the optical axis with respect to the reference guide rail can be adjusted readily and accurately.

WHAT IS CLAIMED IS:

1. In an optical system for an optical information recording and reproducing device, an optical axis adjustment mechanism comprising:
    a laser ray source for emitting a laser beam;
    a collimator lens for forming the laser beam, emitted from said laser ray source, into a beam of parallel rays;
    a guide rail;
    an objective optical system, movable along said guide rail, for focusing the laser beam on a storage medium;
    parallelism adjusting means for adjusting the parallelism of the optical axis of the laser beam in a first direction with respect to said guide rail; and
    displacement amount adjusting means for adjusting the amount of displacement of the optical axis of the laser beam in a second direction with respect to the axis of an objective lens;
    wherein said parallelism adjusting means and said displacement amount adjusting means operate independently so as not to interfere with each other.

2. An optical system as claimed in claim 1, further comprising:
    an anamorphic prism for shaping the parallel rays passed through said collimator lens.

3. An optical axis adjustment mechanism as claimed in claim 2, wherein said parallelism adjusting means comprises an optical means for directing the laser beam from the collimator lens to the objective optical system, a first support base on which said optical means is mounted, an inclination adjusting rod, and means connected to said support base for accommodating said inclination adjusting rod, such that said optical means rotates about said inclination adjusting rod so as to adjust said parallelism of said optical axis.

4. An optical axis adjusting mechanism as claimed in claim 3, wherein said displacement amount adjusting means comprise a second support base on which said anamorphic prism is mounted, a displacement adjusting rod, and means connected to said second support base for accommodating said displacement adjusting rod, such that said anamorphic prism is translated in response to a rotation of said displacement adjusting rod so as to adjust said displacement of said optical axis.

5. An optical axis adjustment mechanism as claimed in claim 2, wherein said displacement amount adjusting means comprises a first support base on which said anamorphic prism is mounted, a displacement adjusting rod, and means connected to said first support base for accommodating said displacement adjusting rod, such that said anamorphic prism is translated in response to a rotation of said displacement adjusting rod so as to adjust said displacement of said optical axis.

6. An optical axis adjustment mechanism as claimed in claim 2, further comprising means for adjustably mounting said laser ray source, said adjustably mounting means comprising:
 a first screw;
 a second screw, said first screw forming a fulcrum about which said laser ray source rotates in said first direction in accordance with a screw adjustment of said second screw; and
 a third screw, said first screw forming a fulcrum about which said laser ray source rotates in said second direction in accordance with a screw adjustment of said third screw.

7. An optical axis adjustment mechanism as claimed in claim 1, wherein said parallelism adjusting means comprising an optical means for directing the laser beam from the collimator lens to the objective optical system, a first support base on which said optical means is mounted, an inclination adjusting rod, and means connected to said support base for accommodating said inclination adjusting rod such that said optical means rotates about said inclination adjusting rod so as to adjust said parallelism of said optical axis.

8. A method of adjusting the optical axis of an optical system for an optical data recording and reproducing device in which an objective optical system, including a first part and a second part, is movable along a guide rail supported by mounting members and is adapted to focus a laser beam on a memory medium which is outputted by a laser beam source, said guide rail extending in an axial direction, said method comprising the following steps:
 mounting an optical axis adjusting jig having reflecting surface on the optical path of said laser beam, on said mounting members provided for said guide rail in such a manner that said reflecting surface is perpendicular to said axial direction;
 setting an auto collimator in such a manner that the optical axis thereof is perpendicular to said reflecting surface; and
 thereafter, adjusting an optical axis of said second part of said optical system for said optical data recording and reproducing deice while said laser beam outputted by said laser beam source and reflected by said reflecting surface of said optical axis adjusting jib is being observed with said auto collimator.

9. In an optical system for an optical data recording and reproducing device in which at least a part of an objective optical system is movable along a guide rail supported by mounting members and is adapted to focus a laser beam on a memory medium which is outputted by a laser beam source, said guide rail extending in an axial direction, the improvement comprising:
 an optical axis adjusting jig for adjusting the optical axis of the laser beam, said jig being detachably mounted on said mounting member provided for said guide rail, and having on the optical path of said laser beam a reflecting surface perpendicular to said axial direction.

* * * * *